(12) United States Patent  (10) Patent No.: US 7,837,165 B2
Stone                      (45) Date of Patent:     Nov. 23, 2010

(54) ARTICLE MOUNTING APPARATUS

(76) Inventor: Mark Andrew Stone, 36 Lowlands Road, Belper, Derbyshire DE56 1HN (GB)

( * ) Notice: Subject to any disclaimer, the term of this patent is extended or adjusted under 35 U.S.C. 154(b) by 102 days.

(21) Appl. No.: 11/568,630

(22) PCT Filed: May 5, 2005

(86) PCT No.: PCT/GB2005/001695

§ 371 (c)(1),
(2), (4) Date: Jan. 26, 2007

(87) PCT Pub. No.: WO2005/105618

PCT Pub. Date: Nov. 10, 2005

(65) Prior Publication Data

US 2007/0194189 A1    Aug. 23, 2007

(30) Foreign Application Priority Data

May 5, 2004    (GB) ................... 0409971.9

(51) Int. Cl.
    A47G 29/02    (2006.01)
(52) U.S. Cl. .................. 248/224.51; 248/220.21; 248/309.1; 224/414
(58) Field of Classification Search ............ 248/224.51, 248/224.61, 223.31, 220.21, 309.1, 311.2; 224/414
    See application file for complete search history.

(56) References Cited

U.S. PATENT DOCUMENTS

| 1,446,036 | A | | 2/1923 | Dodd | |
| 3,881,677 | A | * | 5/1975 | Ihlenfeld | 248/311.2 |
| 5,035,389 | A | * | 7/1991 | Wang | 248/224.51 |
| 5,226,625 | A | * | 7/1993 | Hanna | 248/222.13 |
| 5,282,554 | A | * | 2/1994 | Thomas | 224/421 |
| 5,294,012 | A | * | 3/1994 | Shott et al. | 220/23.4 |
| 5,356,105 | A | * | 10/1994 | Andrews | 248/221.11 |
| 6,637,707 | B1 | * | 10/2003 | Gates et al. | 248/224.7 |
| 6,824,114 | B1 | | 11/2004 | VanSkiver | |

FOREIGN PATENT DOCUMENTS

| GB | 1016563 | 1/1966 |
| GB | 1560724 | 2/1980 |
| GB | 2224923 | 5/1990 |

* cited by examiner

*Primary Examiner*—Anita M King
(74) *Attorney, Agent, or Firm*—Chernoff, Vilhauer, McClung & Stenzel, LLP

(57) ABSTRACT

Article mounting apparatus is provided for mounting an article such as a plant container to a support such as a lamp post. The apparatus includes a first bracket for mounting to a support, and a second bracket associated with the article. The first and second brackets are arranged to be mountable together to an engaged position by mutual relative movement in a first direction, and movable from the engaged position to a locked position by mutual relative movement in a second direction, the second direction being different to the first direction. The first and second brackets are arranged so that in the locked position, mutually relative movement of the brackets in a direction substantially opposite to the first direction is substantially prevented.

13 Claims, 6 Drawing Sheets

ARTICLE MOUNTING APPARATUS

This is a national stage application filed under 35 USC 371 based on International Application No. PCT/GB2005/001695 filed May 5, 2005, and claims priority under 35 USC 119 of United Kingdom Patent Application No. 0409971.9 filed May 5, 2004.

The present invention relates to article mounting apparatus, particularly but not exclusively to article mounting apparatus for mounting an article to a support.

Conventionally, articles such as plant containers are mounted on ground engaging support members such as lampposts by means of brackets. Typically, the brackets are L-shaped, one leg of the L being fixed to the lamppost, the other leg of the L extending outwardly from the post. Two semi-circular plant containers are provided which are fixed together around the lamppost and seat on the outwardly extending leg of the bracket. However, such arrangements have a number of disadvantages. In particular, such arrangements are vulnerable to vandalism, in which the containers are dislodged from the brackets.

According to the present invention, there is provided article mounting apparatus for mounting an article to a support, the apparatus including a first bracket for mounting to a support, a second bracket associated with an article, the first bracket and the second bracket being arranged to be mountable together to an engaged position by mutual relative movement of the first and second brackets in a first direction, and movable from the engaged position to a locked position by mutual relative movement of the first and second brackets in a second direction, the second direction being different to the first direction, the first and second brackets being arranged so that, in the locked position, mutual relative movement of the first and second brackets in a direction substantially opposite to the first direction is substantially prevented.

Preferably, the first and second brackets are selectively movable from the engaged position to the locked position.

Preferably the first bracket includes a first engaging part. Preferably the second bracket includes a second engaging part. Preferably in the engaged position, the first and second engaging parts are engaged together.

Preferably, one of the first or second engaging parts defines a channel. Preferably the other of the first or second engaging parts includes an engaging projection. Preferably the engaging projection is receivable in the channel. Preferably in use the channel extends substantially along the first direction. Preferably in use the engaging projection extends substantially along the first direction, and may taper inwardly generally along the first direction in use.

Preferably the first bracket includes a first locking part. Preferably the second bracket includes a second locking part. Preferably in the locked position, the first and second locking parts are engaged together.

Preferably one of the first or second locking parts includes a locking projection. Preferably the other of the first or second locking parts defines a passage. Preferably the locking projection extends substantially along the second direction. Preferably in the locked position the locking projection locates in the passage.

Preferably in use the first direction is a substantially vertical direction.

The first and second brackets may be arranged so that in the locked position, the first and second locking parts are substantially concealed from view.

Preferably the first bracket includes mounting means for mounting the bracket to the support. Preferably the first bracket includes a body. Preferably the body comprises a mounting member, which may form part of the mounting means. The body may include a pair of spaced, substantially parallel side members which may extend from the mounting member to define the channel. Each side member may include a lip, and each lip may extend inwardly towards the other lip. The lips may define a mouth.

The body may include a support member, which may extend from the mounting member.

The first bracket may be formed of metal, and is desirably formed of steel.

The second bracket may be mountable to the article, or may be formed integrally with the article.

Preferably the second bracket includes a body member mountable to the article or formed integrally with the article. The engaging projection may extend from the body member. Preferably a web member extends between the engaging projection and the body member.

Preferably in use in the engaged position, the web member extends through the mouth.

Preferably the apparatus includes biasing means, which may bias the first and second brackets to move from the engaged position to the locked position. The biasing means may include a pivot point on which the second bracket may pivot in use. The pivot point may be located on the first bracket, and may be located on the support member. The apparatus may be arranged so that the weight of the article acts about the pivot point to bias the first and second brackets into the locked position.

The second direction may be the direction of rotation of the second bracket about the pivot point.

Preferably the apparatus includes securing means to substantially prevent relative movement of the first and second brackets in a direction opposite to the second direction from the locked position. The securing means may comprise a threaded member, which may be threadably engaged in one of the first or second brackets and which may be adjustable. The threaded member may act upon the other of the first or second brackets or the support in the locked position. The apparatus may be arranged so that in use the securing means are substantially concealed.

Further according to the present invention, there is provided a first bracket mountable to a support, the first bracket having the features of the first bracket set out above.

Still further according to the present invention, there is provided a second bracket on which an article is mountable, the second bracket being as set out above.

Still further according to the present invention, there is provided an article, the article including a body, a second bracket extending from the article body, the second bracket being as set out above.

The second bracket may be formed integrally with the article body. The article may be formed of plastics material, and may be formed of polyethylene. Preferably the article is formed by moulding, and may be formed by rotational moulding. The article may be arranged so that in use the first and second engaging parts are substantially concealed.

In one embodiment, the article may be a container, and may be a plant container. Alternatively, the container may be a litter bin.

The present invention will now be described, by way of example only and with reference to the accompanying drawings, in which.

Figure 1:
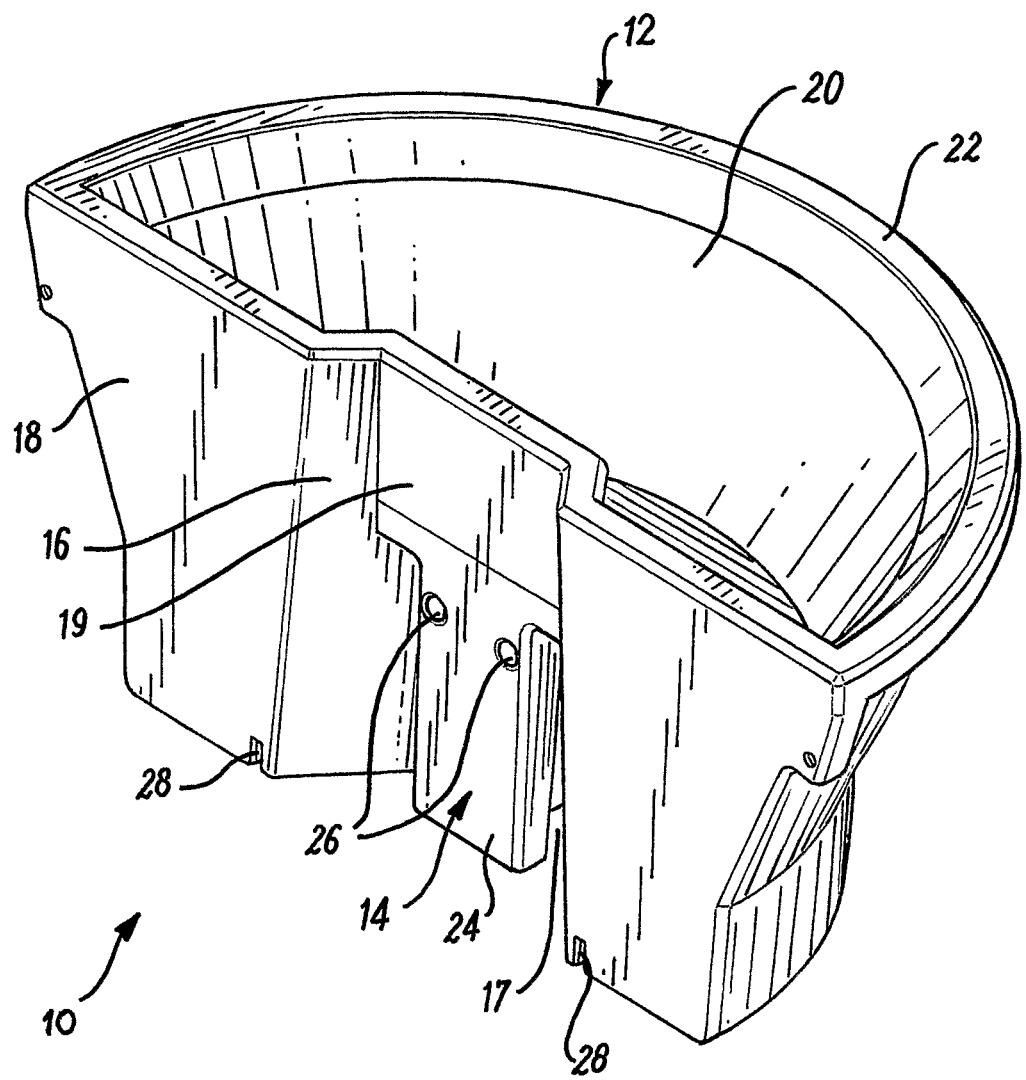
FIG. 1 is a perspective view of an article according to the invention.

FIG. 1 shows an article in the form of a plant container 10, the plant container 10 including a body 12. The body 12 includes a rear wall 18, a semi-circular front wall 22 and a base 32, which together define an interior 20. Each wall 18, 22, 32 is double skinned, defining an enclosed cavity therebetween, a lower part of which cavity forms a water reservoir 21. Such containers are commonly called "self watering containers". Such containers include filling means in the form of a filling aperture (not shown) defined in the outer skin of the semi circular front wall 22 to allow filling and replenishment of the water in the water reservoir 21. In use, the interior 20 is filled with plant compost and plant material, and a capillary means such as capillary matting is provided between the water reservoir 21 and the interior 20 to allow the plants planted in the interior 20 to draw up water from the water reservoir 21.

The container 10 is formed of plastics material, and more particularly is formed of polyethylene, and is formed by rotational moulding.

The rear wall 18 includes a recess 16. The in use upper part of the recess 16 is relatively shallow having an upper recess rear wall 19. The lower part 17 of the recess 16 is deeper than the upper part, extending further into the container 10.

The container 10 includes a container bracket 14 which includes an engaging projection 24 extending downwardly from the upper recess rear wall 19 into the deeper recess 17. A web 30 extends from the engaging projection 24 to the rear wall 18 in the deeper recess 17. As shown most clearly in FIG. 2, the engaging projection 24 and the web 30 form a T shape when viewed from below.

Figure 2:
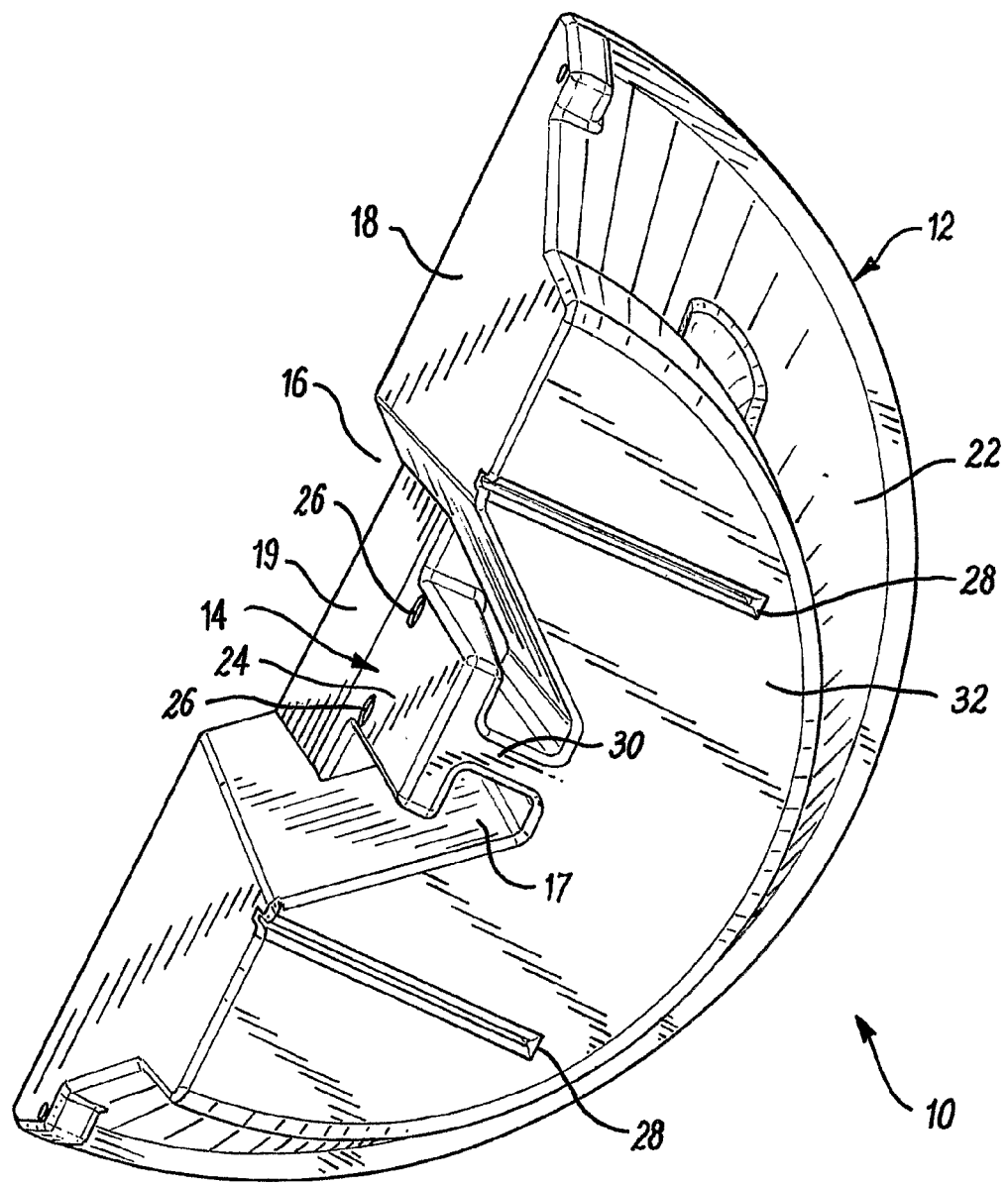
FIG. 2 is another perspective view of the article of FIG. 1.
Figure 4:
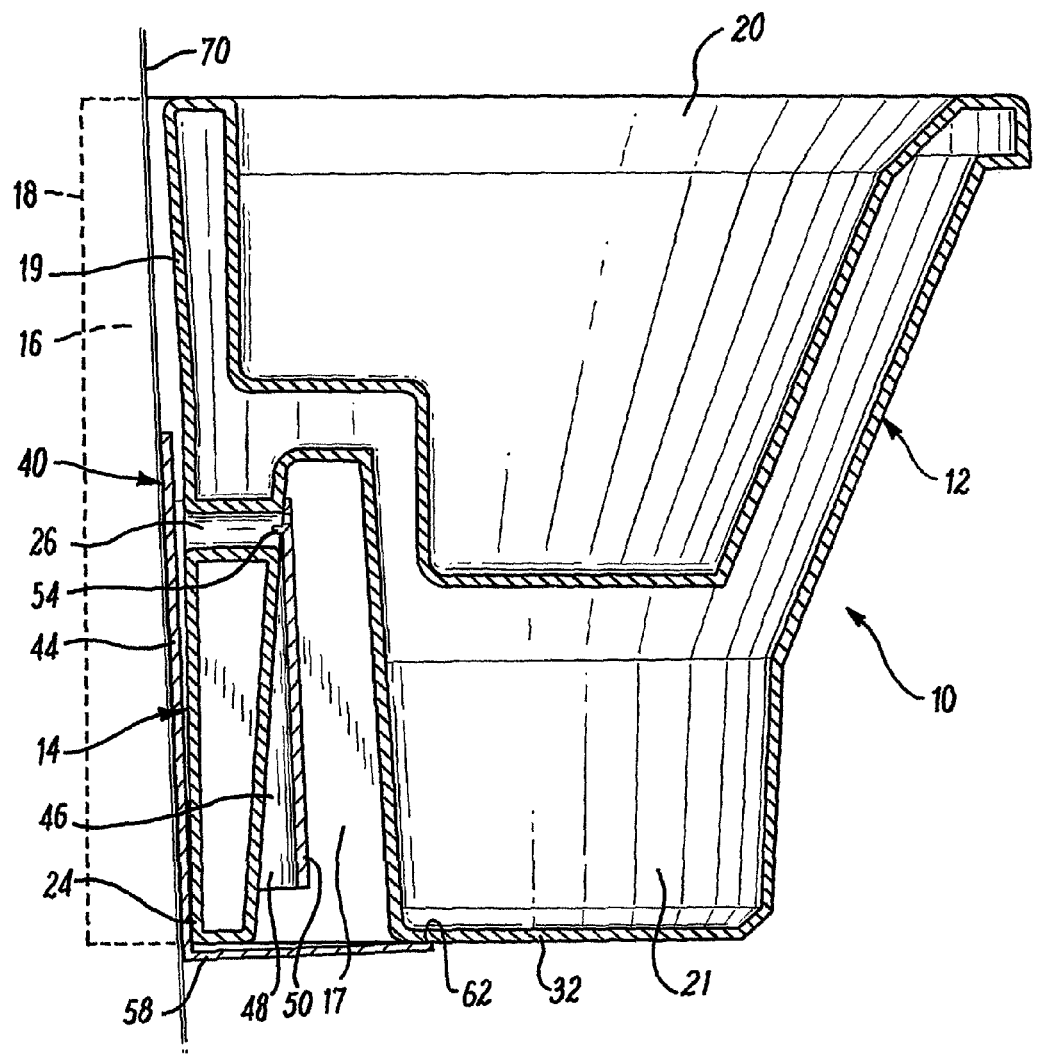
FIG. 4 is a sectional side view of the article of FIGS. 1 and 2 mounted to the bracket of FIG. 3.

As shown most clearly in FIGS. 2 and 4, the engaging projection tapers inwardly downwardly from the upper recess rear wall 19.

The engaging projection 24 defines a pair of parallel through passages 26 which extend from front to rear of the engaging projection 24 and are located in the upper part of the engaging projection 24.

The base 32 defines a pair of parallel channels 28 which extend from the rear wall 18 close to the recess 16, with one channel on either side of the recess 16. The channels 28 extend substantially across most of the width of the base 32.

Figure 3:
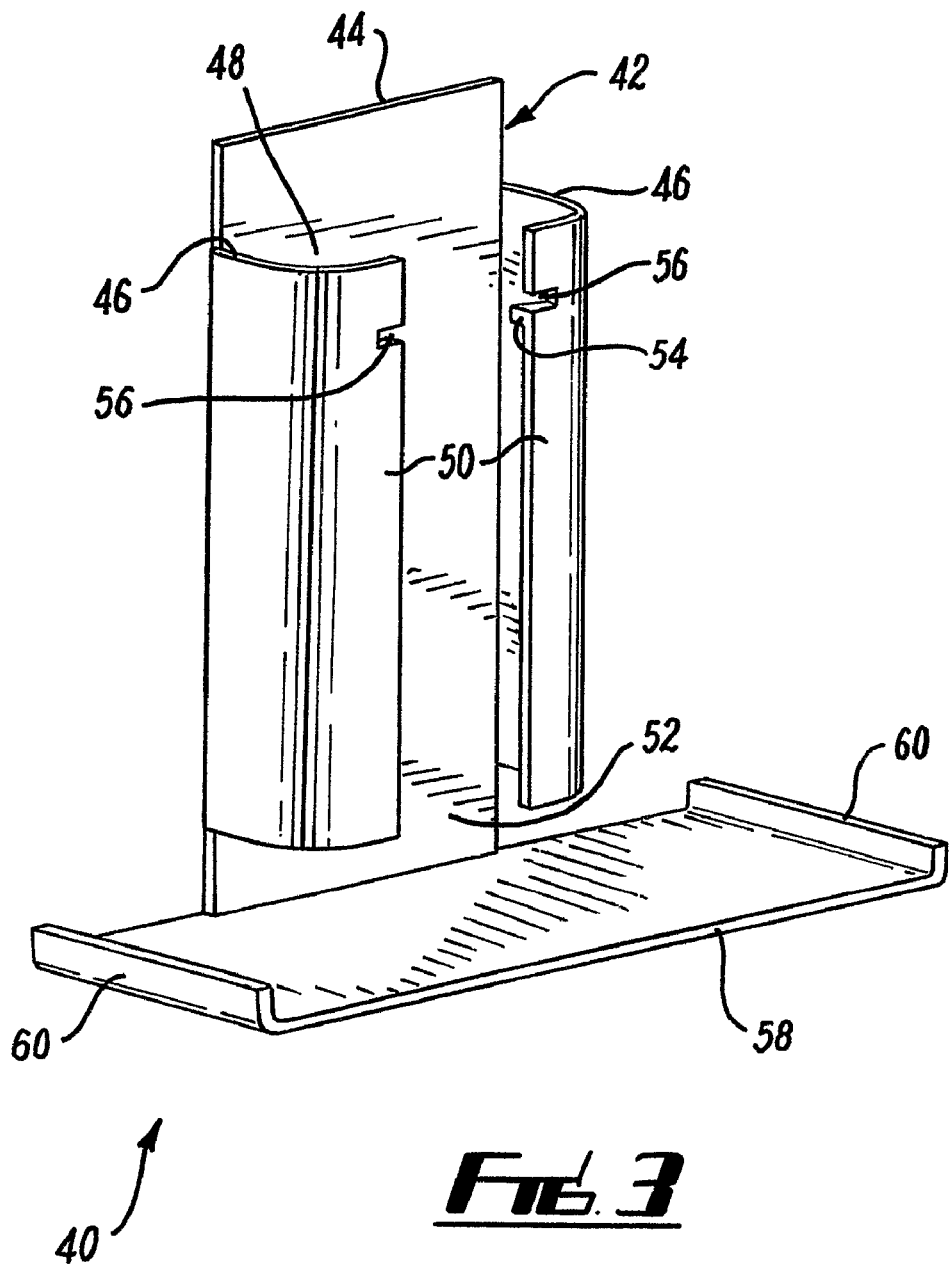
FIG. 3 is a perspective view of a bracket according to the invention.

FIG. 3 shows a post bracket 40 having a body 42, the body 42 including a mounting member 44 in the form of a generally rectangular planar plate. A pair of spaced, substantially parallel side members 46 extend forwardly from the plate 44. Each side member 46 includes a lip 50, each lip 50 extending inwardly towards the other lip 50 of the other side member 46. Together, the mounting member 44, the side members 46 and the lips 50 define a channel 48. A mouth 52 is defined between the lips 50.

Each lip 50 includes a locking projection in the form of a lug 54 which extends backwardly into the channel 48. The lugs 54 are located towards the upper end of the lips 50 in use.

A generally rectangular planar support member 58 extends substantially horizontally in use and forwardly from a lower edge of the mounting member 44. The support member 58 extends outwardly on either side of the mounting member 44. At each side edge of the support member 58, the support member 58 extends upwardly to form a rim 60.

The post bracket 40 is fabricated from steel. The lugs 54 are formed by cutting and bending of the lips 50, which forming process results in the formed apertures 56. After fabrication, the post bracket 40 is finished with a suitable protective coating.

FIG. 4 shows the apparatus in use. The post bracket 40 is mounted by conventional means to a ground engaging support member in the form of a lamppost 70, so that the plane of the mounting member 44 is substantially vertical, and the plane of the support member 58 is substantially horizontal. The plant container 10 is located over the post bracket 40 and moved in a substantially vertical downward direction so that the engaging projection 24 is received in the channel 48. Movement continues until the container 10 locates on the support member 58. In this position, the engaged position, the engaging projection 24 is engaged within the bracket 40 and the web 30 extends through the mouth 52, but the lugs 54 are not within the passages 26.

The container 10 is then pivoted about a pivot point 62 which is located on the support member 58. The container 10 pivots forwardly and downwardly so that the upper part of the engaging projection 24 moves forwardly within the channel 48 to a locked position in which the passages 26 receive the lugs 54, as shown in FIG. 4.

The centre of gravity of the container 1 0 is forward of the pivot point 62, so that the container 10 is biased to move from the engaged position to the locked position by the weight of the container 10. The degree of biasing is increased when the container 10 is filled with compost and plants, and even more so when water is present in the reservoir 21.

Removal of the container 10 from the post bracket 40 can be effected by simply reversing the above steps i.e. by pivoting the container 10 backwards and upwards to the engaged position and then lifting the container 10 substantially vertically upwardly off the post bracket 40.

In the locked position, each lug 54 is received in the corresponding passage 26 so that if an attempt is made to move the container 10 vertically upwards to dislodge the container 10 from the post bracket 40, the location of the lugs 54 in the passages 26 prevents the upward movement.

The taper of the engaging projection 24 allows ease of manufacture, and also aids location of the engaging projection 24 in the channel 48. The engaging projection 24 is arranged to fit within the channel 48 so that only a relatively small pivotal movement of the container 10 is required to engage the lugs within the passages 26.

Figure 5:
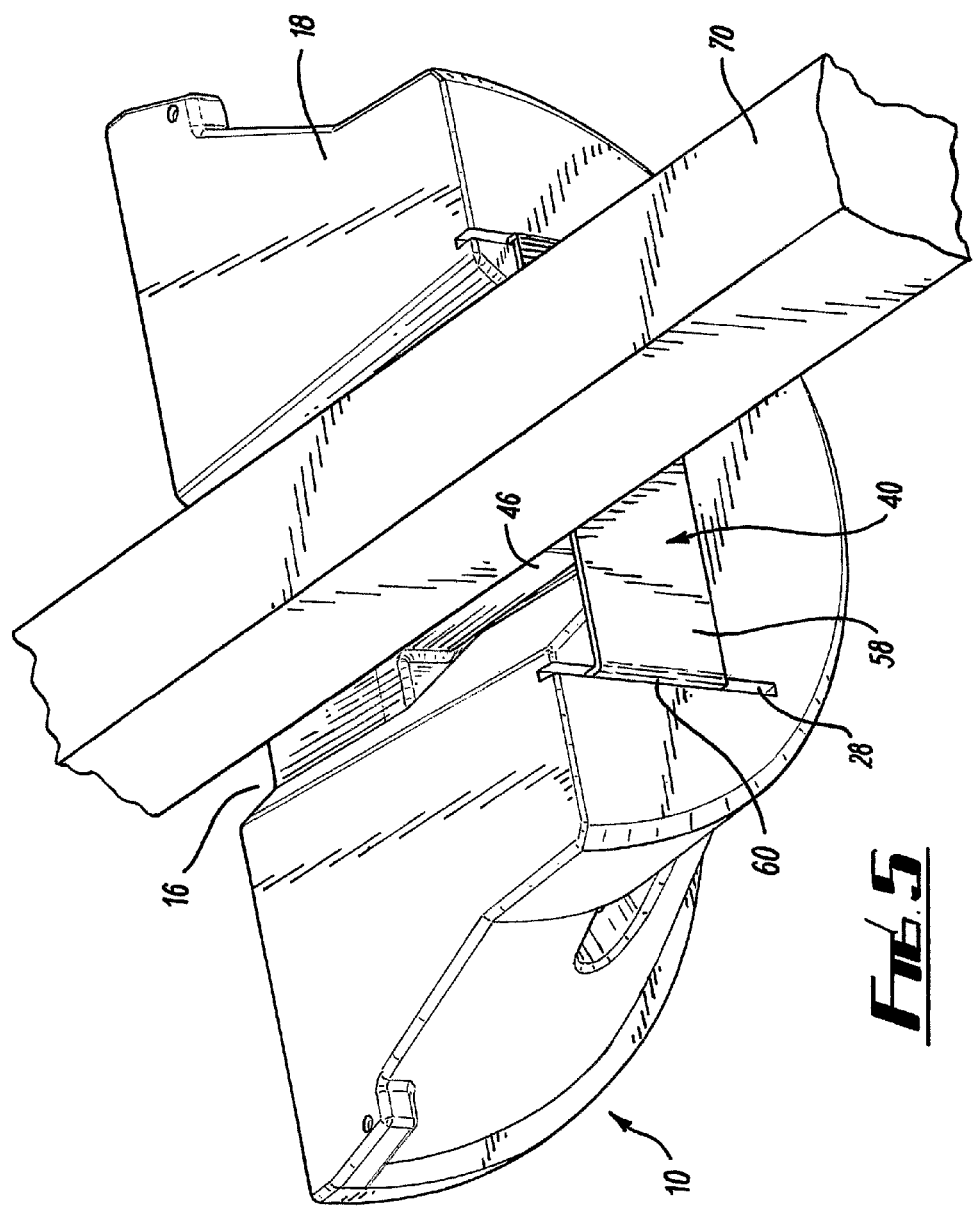
FIG. 5 is a perspective view of the article of FIGS. 1 and 2 mounted to the bracket of FIG. 3.

As the engaging projection 24 locates within the channel 48, the upturned rims 60 of the support member 58 locate in the channels 28 of the base 32 of the container 10 as shown in FIG. 5. The base channels 28 and rims 60 are aligned parallel with the plane of the direction of pivotal movement of the container 10 when moving from the engaged position to the locked position, so that the engagement of the rims 60 in the base channels 28 does not prevent the pivotal movement. The engagement of the rims 60 in the base channels 28 substantially prevents rotational movement of the container 10 about the axis of the post 70.

The web 30 serves to strengthen the engaging projection 24, and the location of the web 30 in the mouth 52 also helps prevent rotational movement of the container 10 about the axis of the post 70.

FIG. 5 shows a container 10 mounted to a post bracket 40, the post bracket 40 being mounted to a post 70. The post 70 partially lies within the recess 16, and it will be noted that the engagement of the lugs 54 in the passages 26 is substantially concealed from view in the locked position. Thus there is no suggestion to the unauthorised person of the actions necessary to effect removal of the container 10 from the post bracket 40.

Furthermore, in use a further container 10 could be mounted to a further post bracket 40 mounted on the opposite side of the post 70. The dimensions of the recesses 16 and the posts 70 are selected so that the rear walls 18 of the two containers 10 abut, further obscuring the post brackets 40 from view. In FIG. 4, a dotted line indicates the position of the rear wall 18 relative to the post 70.

Figure 6:
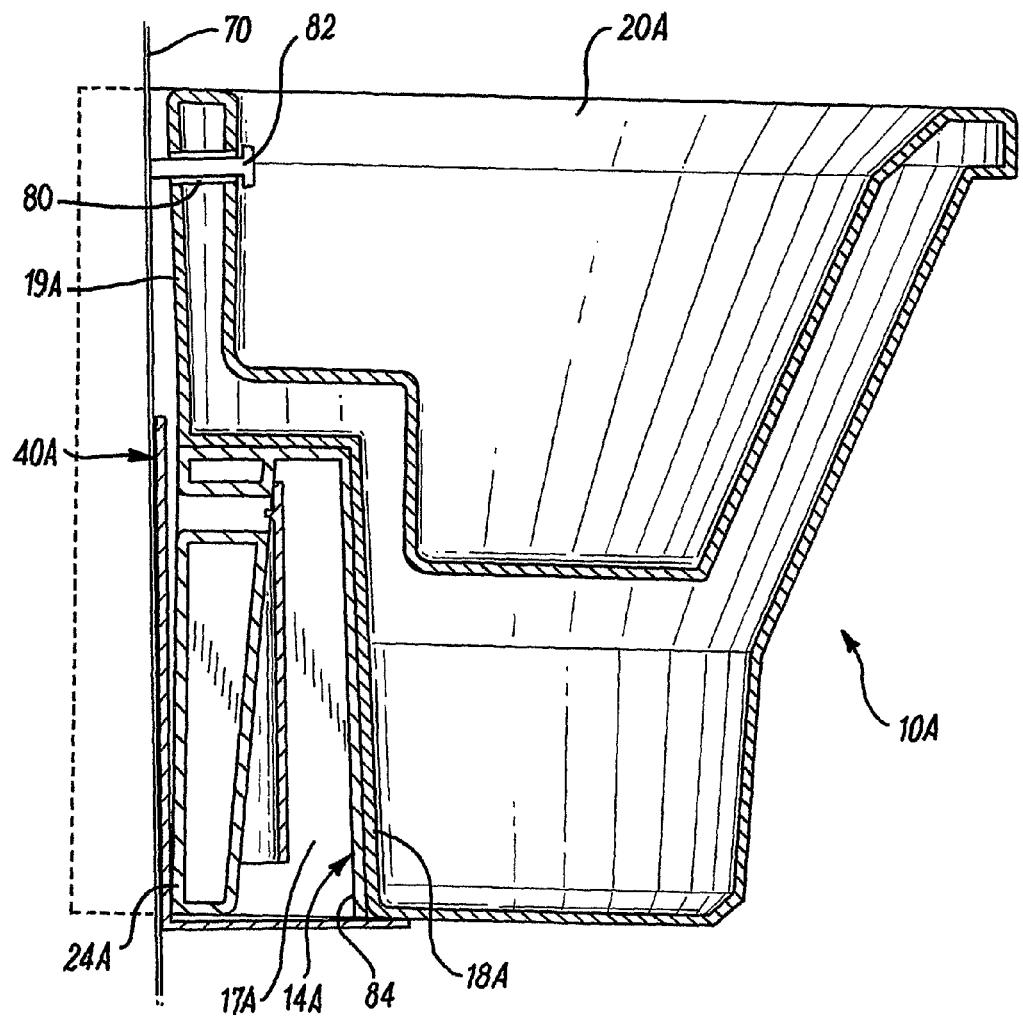
FIG. 6 is a sectional side view of another apparatus according to the invention.

FIG. 6 shows another example of the invention. In the example shown in FIG. 6, many of the features are the same as those previously shown in FIGS. 1 to 5. Where features are the same, the suffix A has been added to the reference numerals. In the example shown in FIGS. 1 to 5, the container bracket 14 associated with the article 10 is formed integrally with the article body 12. In FIG. 6, a container bracket 14A is provided separately to a plant container 10A. The container bracket 14A includes a body member 84 which is generally L-shaped and corresponds with the shape of the rear wall 18A of the deeper recess 17A. An engaging projection 24A extends downwardly from one of the legs of the body member 84. The container bracket 14A can be mounted to the plant container 10A by any convenient known fixing means.

The container 10A with the container bracket 14A is mounted to a post bracket 40A in a similar manner to that previously described for the embodiment shown in FIGS. 1 to 5.

The provision of a separate container bracket 14A provides the advantage that the container bracket 14A may be made of stronger material such as steel, and the moulding of the container 10A is simpler.

In the example shown in FIG. 6, the apparatus includes securing means in the form of a threaded member such as a bolt 82 which locates through, and threadably engages with, a securing passage 80 located in the upper recess rear wall 19A of the container 10A. In use, when the container 10A is moved to the locked position, the bolt 82 is tightened against the post 70, securing the container 10A in the locked position against movement in a pivotal direction away from the locked position. When the interior 20A is filled with compost and plants, the bolt 82 is concealed, so that unauthorised persons cannot easily see how the container 10A may be dislodged from the post 70.

Various other modifications may be made without departing from the scope of the invention. The article could be any suitable article. In particular, the article could be a litter bin. Litter bins are commonly mounted to walls or posts in public places, and are subject to vandalism.

The features of the invention as described could be configured differently. For instance, the lugs could be provided on the engaging projection and the passages could be provided on the lips. The post bracket could include an upstanding engaging projection, which is received within a channel defined by the container bracket. The pivot point could be located in a different place. The securing means could be located so that the threaded member tightens against the post bracket.

There is thus provided article mounting apparatus which allows simple mounting of an article to a support, and further, allows simple removal of the article from the support by an authorised person, while substantially preventing removal by unauthorised persons. The lugs and passages, and the engaging projection and channel are substantially hidden from view in use so that it is not obvious to an unauthorised person how the container may be dismounted from the post.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Article mounting apparatus for mounting an article to a support, the apparatus including a first bracket for mounting to a support, the first bracket including a body, the body comprising a mounting member and a support member, the support member extending from the mounting member, the apparatus including a second bracket associated with an article, the first bracket and the second bracket being arranged to be mountable together to an engaged position by relative movement of the second bracket in a first substantially vertical downward direction, and movable from the engaged position to a locked position by relative movement of the second bracket in a second direction, the second direction being different to the first direction and being a rotational direction about a pivot point, the pivot point being located on the support member, the first and second brackets being arranged so that, in the locked position, relative movement of the second bracket in a direction substantially opposite to the first direction is substantially prevented.

2. Apparatus according to claim 1, in which the first bracket includes a first engaging part, the second bracket includes a second engaging part, and in the engaged position, the first and second engaging parts are engaged together, one of the first or second engaging parts defining a channel, the other of the first or second engaging parts including an engaging projection which is receivable in the channel, in use the engaging projection extending substantially along the first direction.

3. Apparatus according to claim 1, in which the first bracket includes a first locking part, and the second bracket includes a second locking part, in the locked position, the first and second locking parts being engaged together, one of the first or second locking parts including a locking projection, the locking projection extending substantially along the second direction, the other of the first or second locking parts defining a passage, and in the locked position the locking projection locating in the passage.

4. Apparatus according to claim 1, in which the first bracket includes a first locking part, and the second bracket includes a second locking part, the first and second brackets being arranged so that in the locked position, the first and second locking parts are substantially concealed from view.

5. Apparatus according to claim 1, in which the first bracket is formed of metal.

6. Apparatus according to claim 1, in which the second bracket is mountable to the article.

7. Apparatus according to claim 1, in which the second bracket is formed integrally with the article.

8. Apparatus according to claim 1, in which the apparatus includes biasing means, which bias the first and second brackets to move from the engaged position to the locked position the biasing means including the pivot point on which the second bracket pivots in use, the apparatus being arranged so that the weight of the article acts about the pivot point to bias the first and second brackets into the locked position.

9. Apparatus according to claim 1, in which the apparatus includes securing means to substantially prevent relative movement of the second bracket in a direction opposite to the second direction from the locked position.

10. In combination, article mounting apparatus according to claim 1, for mounting an article to a support and an article for mounting to the support by the apparatus, wherein the article is a plant container.

11. In combination, article mounting apparatus according to claim 1, for mounting an article to a support and an article for mounting to the support by the apparatus, wherein the article is formed of plastics material by molding.

12. A first bracket for mounting an article to a support, the first bracket being arranged for mounting to the support, to support a second bracket associated with the article, the first bracket including a body, the body comprising a mounting member and a support member, the support member extending from the mounting member, the first bracket and the second bracket being arranged to be mountable together to an engaged position by relative movement of the second bracket in a first substantially vertical downward direction, and movable from the engaged position to a locked position by relative movement of the second bracket in a second direction, the second direction being different to the first direction and being a rotational direction about a pivot point, the pivot point being located on the support member, the first and second brackets being arranged so that, in the locked position, relative movement of the second bracket in a direction substantially opposite to the first direction is substantially prevented.

13. A second bracket for mounting an article to a support, the second bracket being associated with the article and being arranged to be mountable to a first bracket which is arranged for mounting to a support, the first bracket including a body, the body comprising a mounting member and a support member, the support member extending from the mounting member, the first bracket and the second bracket being arranged to be mountable together to an engaged position by relative movement of the second bracket in a first substantially vertical downward direction, and moveable from the engaged position to a locked position by relative movement of the second bracket in a second direction, the second direction being different to the first direction and being a rotational direction about a pivot point, the pivot point being located on the support member, the first and second brackets being arranged so that, in the locked position, relative movement of the second bracket in a direction substantially opposite to the first direction is substantially prevented.

* * * * *